(12) United States Patent
Evreinov et al.

(10) Patent No.: US 9,485,964 B2
(45) Date of Patent: Nov. 8, 2016

(54) LIVING BODY STIMULATION DEVICE AND LIVING BODY STIMULATION METHOD

(71) Applicants: TAMPEREEN YLIOPISTO, Tampereen yliopisto (FI); FUKOKU CO., LTD., Ageo-shi, Saitama (JP)

(72) Inventors: Grigori Evreinov, Tampere (FI); Ahmed Farooq, Tampere (FI); Roope Raisamo, Tampere (FI); Arto Hippula, Tampere (FI); Daisuke Takahata, Saitama (JP); Tetsuya Arasawa, Saitama (JP); Kazuyuki Ikehama, Saitama (JP)

(73) Assignees: TAMPEREEN YLIOPISTO, Tampereen Yliopisto (FI); FUKOKU CO., LTD., Saitama (JP)

( * ) Notice: Subject to any disclaimer, the term of this patent is extended or adjusted under 35 U.S.C. 154(b) by 0 days.

(21) Appl. No.: 14/794,250

(22) Filed: Jul. 8, 2015

(65) Prior Publication Data

US 2016/0007568 A1    Jan. 14, 2016

(51) Int. Cl.
*A01K 15/00* (2006.01)
*A01K 15/02* (2006.01)

(52) U.S. Cl.
CPC ............ *A01K 15/022* (2013.01); *A01K 15/02* (2013.01)

(58) Field of Classification Search
CPC ............ A01K 15/021; A01K 27/009; A61B 5/04085; A61B 5/04087; A61N 1/046; A61N 1/0492; A61N 1/0496; A61D 7/00
USPC ....... 119/712, 718, 719, 720, 721, 859, 860, 119/857, 908; 600/386, 393; 340/573.1, 340/573.3
See application file for complete search history.

(56) References Cited

U.S. PATENT DOCUMENTS

| | | | | |
|---|---|---|---|---|
| 2,791,202 A | * | 5/1957 | Doyle | A01K 27/007 119/654 |
| 4,369,783 A | * | 1/1983 | Hiller | A61D 7/00 119/860 |
| 4,901,674 A | * | 2/1990 | Bushman | A01K 27/007 119/651 |
| 5,471,954 A | * | 12/1995 | Gonda | A01K 27/009 119/859 |
| 5,665,477 A | * | 9/1997 | Meathrel | A61B 5/04087 427/2.12 |
| 5,788,633 A | * | 8/1998 | Mahoney | A61B 5/04085 600/382 |
| 5,980,496 A | * | 11/1999 | Jacobsen | A01K 27/007 119/606 |
| 6,079,367 A | * | 6/2000 | Stapelfeld | A01K 15/021 119/719 |
| 6,453,186 B1 | * | 9/2002 | Lovejoy | A61B 5/04085 600/386 |
| 6,712,025 B2 | * | 3/2004 | Peterson | A01K 15/023 119/721 |

(Continued)

FOREIGN PATENT DOCUMENTS

JP   2003158940   6/2003
JP   2005348657   12/2005

*Primary Examiner* — Yvonne Abbott-Lewis
(74) *Attorney, Agent, or Firm* — Andrew M. Calderon; Roberts Mlotkowski Safran Cole & Calderon, P.C.

(57) ABSTRACT

One embodiment of the present invention provides a living body stimulation device including: an envelope body having a living body contact surface which is to be brought into contact with a stimulation-target site of a living body; a propagation medium sealed in the envelope body and made of a liquid or gel material capable of transmitting a vibration and/or pressure; and an actuator configured to apply the vibration and/or pressure to the propagation medium. The vibration and/or pressure applied to the propagation medium by the actuator propagates through the propagation medium to the living body contact surface of the envelope body, to thereby stimulate the living body.

20 Claims, 7 Drawing Sheets

(56) References Cited

U.S. PATENT DOCUMENTS

| | | | | |
|---|---|---|---|---|
| 6,845,272 B1 * | 1/2005 | Thomsen | | A61B 5/04087 607/142 |
| 6,898,465 B2 * | 5/2005 | Gadsby | | A61N 1/0492 607/142 |
| 7,013,179 B2 * | 3/2006 | Carter | | A61N 1/0504 607/46 |
| 7,185,613 B2 * | 3/2007 | Arvanitis | | A01K 27/007 119/857 |
| 7,286,865 B2 * | 10/2007 | Nazeri | | A61B 5/0006 600/382 |
| 7,841,301 B2 * | 11/2010 | Mainini | | A01K 15/021 119/712 |
| 8,773,258 B2 * | 7/2014 | Vosch | | H04Q 9/00 340/286.07 |

* cited by examiner

LIVING BODY STIMULATION DEVICE AND LIVING BODY STIMULATION METHOD

CROSS-REFERENCE TO RELATED APPLICATION(S)

This application claims priority from JP Patent Application No. 2014-141266 filed on Jul. 9, 2014, the entire contents of which are incorporated herein by reference.

TECHNICAL FIELD

The present invention relates generally to a living body stimulation device and a living body stimulation method.

BACKGROUND ART

Among known living body stimulation devices are barking suppression devices which stimulate the neck of a dog in the form of a vibration. For example, in the case of the barking suppression device disclosed in JP-2005-348657-A, a body case incorporating it is to be attached to a dog collar at the center. The surface to be brought into contact with the neck of a dog is provided with projection-like vibration units each being a vibrator which is driven by an electric motor. JP-2003-158940-A discloses a pet collar with a training function to which a vibration device is attached to a collar directly.

In the barking suppression device disclosed in JP-2005-348657-A, each vibration unit for stimulating the neck of a dog assumes a projection-like shape. Since a belt is wound around and fastened to press the projection-like vibration units against the neck of a dog, a certain load is imposed on the dog's body. Conversely, if the belt is loosened, the projection-like vibration units may be separated from the neck of the dog to become unable to stimulate the neck of the dog by a vibration. That is, in this living body stimulation device, stimulation imposes a certain load on a living body whereas loosening the belt to reduce the load may make it impossible to stimulate the living body.

On the other hand, in the pet collar disclosed in JP-2003-158940-A, a vibratory stimulus can be given to a living body only in a narrow region because the vibration device is attached to the collar.

SUMMARY OF INVENTION

An aspect of the present invention provides a living body stimulation device including: an envelope body having a living body contact surface which is to be brought into contact with a stimulation-target site of a living body; a propagation medium sealed in the envelope body and made of a liquid or gel material capable of transmitting a vibration and/or pressure; and an actuator configured to apply the vibration and/or pressure to the propagation medium, wherein the vibration and/or pressure applied to the propagation medium by the actuator propagates through the propagation medium to the living body contact surface of the envelope body, to thereby stimulate the living body.

This configuration makes it possible to stimulate a living body reliably in a relatively wide region while reducing the associated load on the living body. Furthermore, the living body stimulation device is superior in appearance by virtue of absence of a projection-like stimulus applying member(s) as employed in the related-art.

The envelope body may be attached to a holding member which is to be attached to the living body, to thereby allow the living body contact surface to be kept in contact with the stimulation-target site.

With this configuration, when the holding member is attached to a living body, the living body contact surface of the envelope body can be kept in contact with the stimulation-target site. Therefore, even if the living body moves, the living body contact surface of the envelope body does not deviate from the stimulation-target site. It is thus possible to stimulate the stimulation-target site stably.

The holding member may be flexible.

With this configuration, the envelope body can be attached to a living body easily and so as to conform to its shape.

The holding member may be a flexible band-like body.

With this configuration, the holding member can be implemented as a collar or a torso ring for a pet, a wrist ring for a human, or the like, and can be attached to a living body without causing it to feel uncomfortable.

Plural actuators may be arranged so as to be spaced from each other in an extension direction of the envelope body.

With this configuration, since vibrations and/or pressures can be applied to the propagation medium by the plural actuators, it is possible to stimulate a living body by vibrations and/or pressures with no large attenuation even if the envelope body has a large living body contact surface. A wide variety of stimuli can be applied by controlling the actuator drive timing on an actuator-by-actuator basis. Furthermore, it is possible to stimulate a living body by a vibration in a wide frequency range by setting the vibration frequencies of the plural actuators different from each other.

Plural envelope bodies may be arranged in a length and/or width direction of the holding member and provided with respective actuators.

With this configuration, a wider variety of stimuli can be applied by selectively applying the stimulus to a site of the living body on an envelope-body-by-envelope-body basis. A stimulus can be applied effectively because the envelope bodies can be arranged so as to conform to a curved shape, for example, of a stimulation of a living body. Furthermore, it is possible to stimulate a living body in a wide region without size increase of the envelope body.

One or more of spacers may be disposed between adjoining ones of the envelope bodies.

With this configuration, it is possible to prevent placement of envelope bodies at positions where stimulation is not necessary and size increase of the envelope bodies while allowing a living body to feel as if an envelope body that is continuous two-dimensionally were attached. If the holding member is made easily bendable at each location of spacers, the holding member can be deformed so as to conform to the shape of each location of a living body.

The spacers may be made of the same material as the envelope bodies and the same medium as the propagation medium is sealed in the spacers at the same density.

With this configuration, even where spacers are disposed between adjoining envelope bodies, they would cause the living body to feel the same way as the envelope bodies do and hence could suppress occurrence of discomfort in a two-dimensional area.

Another aspect of the present invention provides a living body stimulation method including: bringing a living body contact surface of an envelope body into contact with a stimulation-target site of a living body, a propagation medium being sealed in the envelope body, the propagation medium being made of a liquid or gel material capable of transmitting a vibration and/or pressure; and applying a vibration and/or pressure to the propagation medium such that the vibration and/or pressure propagates through the propagation medium to the living body contact surface of the envelope body, thereby stimulating the living body.

A holding member may be attached to the living body, thereby allowing the living body contact surface of the envelope body to be kept in contact with the stimulation-target site.

The invention makes it possible to stimulate a living body reliably in a relatively wide region while reducing the associated load on the living body.

BRIEF DESCRIPTION OF DRAWINGS

FIG. 4A shows a state in which an actuator is not in operation and FIG. 4B shows, conceptually, a state in which the actuator is in operation.

DETAILED DESCRIPTION OF EMBODIMENT

Specific living body stimulation devices and living body stimulation methods according to an embodiment and its modifications will be hereinafter described with reference to the drawings. However, the invention is not limited to them but encompasses all other modifications made within the scope of the claims and their equivalents.

Figure 1:
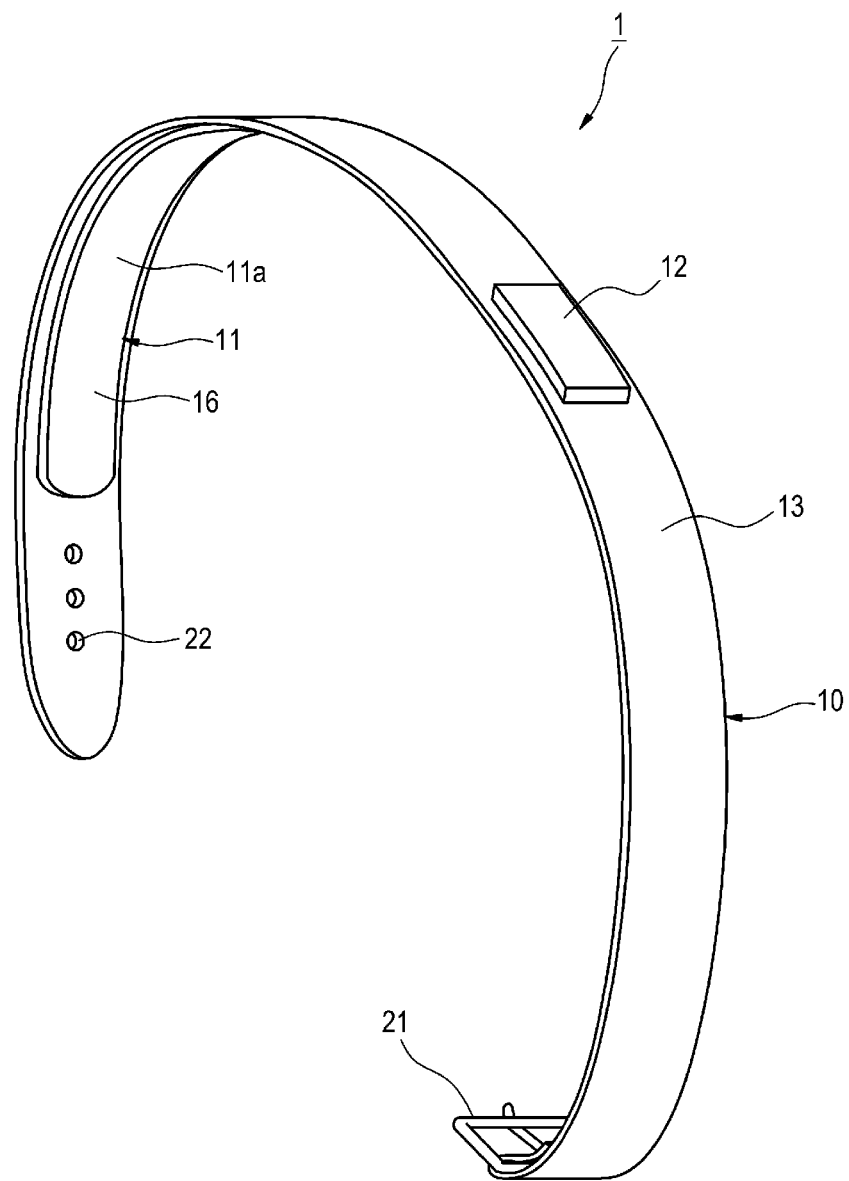
FIG. 1 is a perspective view outlining a living body stimulation device according to an embodiment which includes a belt.
Figure 2:
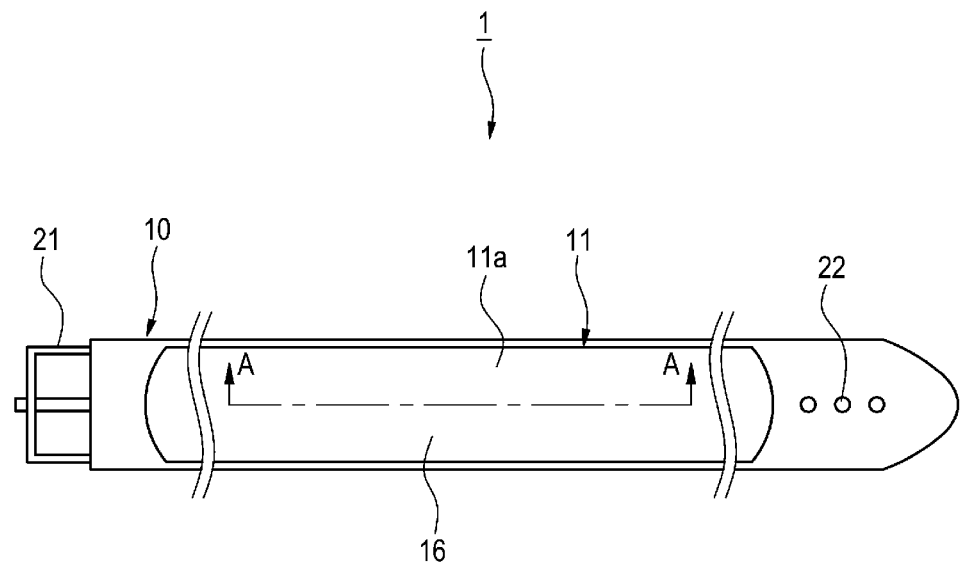
FIG. 2 is a partial plan view of the living body stimulation device as viewed from inside (i.e., from the side of the surface of attachment to a living body).
Figure 3:
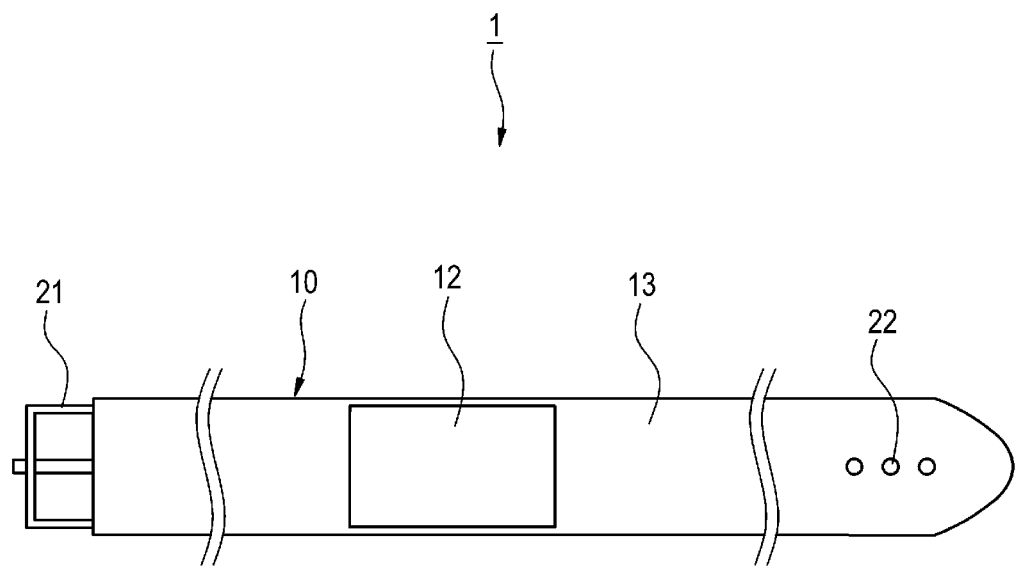
FIG. 3 is a partial plan view of the living body stimulation device as viewed from outside (i.e., from the side that is opposite to the surface of attachment to a living body).
Figure 4A:
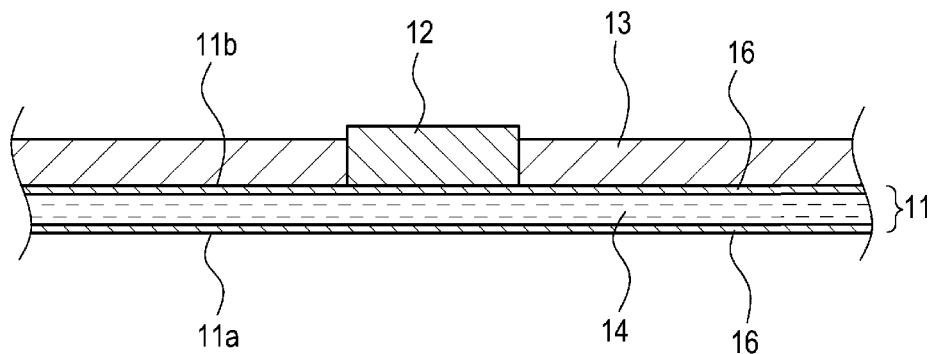
FIGS. 4A and 4B are sectional views taken along line A-A in FIG. 2.
Figure 4B:
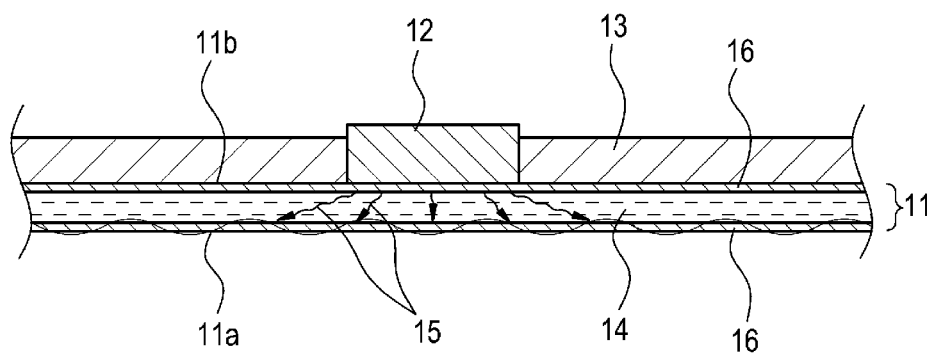

FIG. 1 is a perspective view outlining a living body stimulation device 1 according to the embodiment which includes a belt 10 to be attached to a living body. FIG. 2 is a partial plan view of the living body stimulation device 1 as viewed from inside (i.e., from the side of the surface of attachment to the living body). FIG. 3 is a partial plan view of the living body stimulation device 1 as viewed from outside (i.e., from the side that is opposite to the surface of attachment to the living body). FIGS. 4A and 4B are sectional views taken along line A-A in FIG. 2.

The living body stimulation device 1 shown in FIG. 1 has the belt 10 which is wound around the neck or torso of a pet. Thus worn, the living body stimulation device 1 makes it possible to suppress barking or make a training instruction by stimulating a prescribed site such as the neck of the pet by a vibration or pressure. A holding member 13, which is the body of the belt 10 (band-like body), is flexible and is made of a material generally used for belts such as leather. To fasten the belt 10 so as to form a ring shape, a buckle 21 is attached to one end of the band 10 and plural adjustment holes 22 are formed through it near the other end. For example, the buckle 21 may be made of metal. Alternatively, a plastic clip, Velcro (trademark) or the like may be used as a fastening structure.

As shown in FIGS. 1 and 2, an envelope body 11 which is composed of sheet-like members 16 is attached to the inner surface (i.e., the surface to contact a living body) of the holding member 13 in such a manner that its living body contact surface 11a can come into contact with a stimulation-target site of a living body.

As shown in FIGS. 1 and 3, an actuator 12 is attached to the holding member 13. The actuator 12 is a device for generating a vibration and/or pressure piezoelectrically, electromagnetically, or by some other method.

The sheet-like members 16 are flexible and are polyamide films, for example. As shown in FIG. 4, the inside space of the envelope body 11 is filled with a propagation medium 14. The propagation medium 14 is made or a liquid or gel material capable of transmitting a vibration and/or pressure, that is, distilled water, a silicone gel, a mineral oil, or any of other materials having similar mechanical and optical properties. The propagation medium 14 may be an electrorheological (ER) fluid whose viscosity can be adjusted electrically as long as it can transmit a vibration and/or pressure.

As shown in FIGS. 4A and 4B, the envelope body 11 has a living body contact surface (first surface) 11a and a second surface 11b. The actuator 12 is attached to the holding member 13 so as to be in contact with the second surface 11b. A vibration and/or pressure generated by the actuator 12 can be applied to the propagation medium 14 provided inside the envelope body 11 and propagates through the propagation medium 14. The vibration and/or pressure reaches, that is, is transmitted to, the living body contact surface 11a of the envelope body 11, which then stimulates the living body. Examples waves that propagate through the propagation medium 14 are bending waves 15.

FIG. 4A shows a state in which the actuator 12 is not in operation, and FIG. 4B shows, conceptually, a state in which the actuator 12 is in operation and bending waves 15 are propagating through the propagation medium 14 and a vibration is being transmitted to the living body contact surface 11a.

The actuator 12 need not always be attached to the holding member 13 so as to be in contact with the second surface 11b (i.e., the surface opposite to the living body contact surface 11a) of the envelope body 11 (see FIGS. 4A and 4B) as long as it is attached so as to be able to apply a vibration and/or pressure to the propagation medium 14. The following various modes are available as modes for application of a vibration and/or pressure to the propagation medium 14.

FIGS. 5A to 5H are partial sectional views of living body stimulation devices, respectively, and illustrate various modes in which the actuator 12 applies a vibration and/or pressure to the propagation medium 14.

Figure 5A:
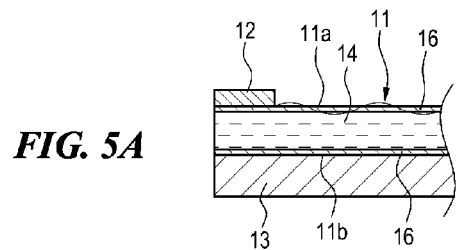
FIGS. 5A to 5H are partial sectional views of living body stimulation devices, respectively, and illustrate various modes for application of a vibration and/or pressure to a propagation medium.
Figure 5B:
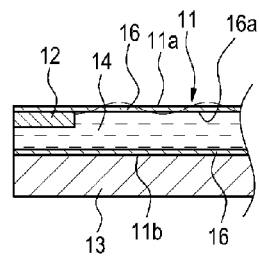
Figure 5C:
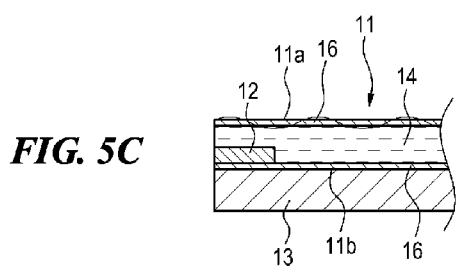

FIG. 5A illustrates a mode in which the actuator 12 is attached to the living body contact surface 11a. FIG. 5B illustrates a mode in which the actuator 12 is attached to a surface 16a, opposite to the living body contact surface 11a, of the associated sheet-like member 16. FIG. 5C illustrates a mode in which the actuator 12 is attached to the surface, opposite to the second surface 11b (i.e., located on the propagation medium 14 side), of the associated sheet-like member 16.

Figure 5D:
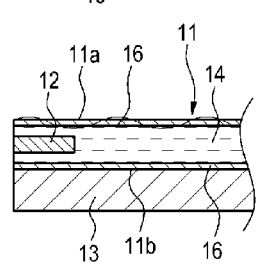
Figure 5E:
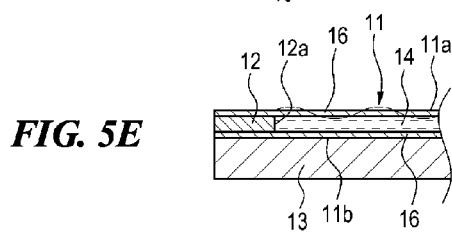
Figure 5F:
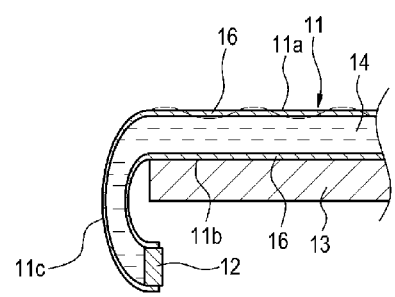

FIG. 5D illustrates a mode in which the actuator 12 is disposed in the propagation medium 14 which is sealed in the envelope body 11. FIG. 5E illustrates a mode in which the actuator 12 is disposed in the propagation medium 14 such that it is in contact with the propagation medium 14 in a restrictive manner, that is, only its one side surface 12a is in contact with the propagation medium 14. FIG. 5F illustrates a mode in which the actuator 12 is disposed in an extension 11c of the envelope body 11.

The actuator 12 used in each of the modes shown in FIGS. 5A to 5F is a magnetostrictive actuator, a multilayer piezoelectric actuator, or any of other actuators that generate a vibration and/or pressure utilizing a liquid pressure, a pneumatic pressure, or some other physical quantity.

Figure 5G:
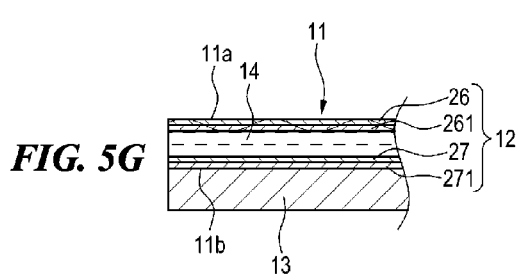
Figure 5H:
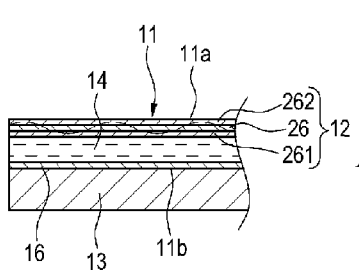

FIGS. 5G and 5H illustrate modes in which the envelope body 11 itself functions as the actuator 12.

In the mode shown in FIG. 5Q top and bottom sheet-like members constituting the envelope body 11 have bodies 26 and 27 and conductive layers 261 and 271 made of a conductive material, respectively. The sheet-like member located on the side of the living body contact surface 11a has the conductive layer 261 inside the envelope body 11, and the sheet-like member located on the side of the second surface 11b has the conductive layer 271 outside the envelope body 11.

The conductive layer 261 is in electrical contact with the propagation medium 14. The conductive layer 271 is electrically insulated from the propagation medium 14 by the body 27 (made of an insulative material) of the sheet-like member. That is, in the mode shown in FIG. 5Q the sheet-like members 26, 261, 27, and 271 constitute the actuator 12.

In the mode shown in FIG. 5H, conductive layers 261 and 262 are formed on the two respective surfaces of a body 26a sheet-like member which is located on the side of the living body contact surface 11a. That is, in the mode shown in FIG. 5H, the sheet-like members 26, 261, and 262 constitute the actuator 12.

In the modes shown in FIGS. 5G and 5H, the propagation medium 14 is a conductive ionic liquid or gel.

The living body stimulation method according to the embodiment is a living body stimulation method that uses the above-described living body stimulation device 1 (or its modified version).

In the living body stimulation method according to the embodiment, the living body contact surface 11a of the envelope body 11 is brought into contact with a stimulation-target site of a living body. The propagation medium 14 made of a liquid or gel material capable of transmitting a vibration and/or pressure is sealed in the envelope body 11 which is formed by the sheet-like members 16 on of which has the living body contact surface 11a. For example, the belt 10 is wound around the neck of a pet so that a vibration and/or pressure can be transmitted to the neck of the pet from the inner surface (the living body contact surface 11a of the envelope body 11) of the belt 10.

The holding member 13 is attached to the living body such that the living body contact surface 11a of the envelope body 11 is kept in contact with the stimulation-target site. For example, the belt 10 is kept wound around the neck of a pet.

By driving the actuator 12 in this state, the living body is stimulated by a vibration and/or pressure that is transmitted to the living body contact surface 11a of the envelope body 11 via the propagation medium 14. For example, the neck of a pet is stimulated. The pet may be stimulated in such a manner that a person turns on or off a drive switch (not shown) of the actuator 12 as appropriate to give the pet an instruction to suppress its barking or train it. For example, the drive switch may be turned on or off by wireless remote control or using a switch that is wire-connected to the actuator 12 by a lead for the pet.

The strength, interval, or the like of stimuli can be changed by changing the frequency of a vibration or the amplitude of a vibration or pressure by changing the duty ratio of a drive signal for the actuator 12. In this manner, different instructions can be given to a pet, for example.

According to the living body stimulation device 1 and the living body stimulation method using it according to the embodiment which have been described above in detail, the living body contact surface 11a of the envelope body 11 in which the propagation medium 14 made of a liquid or gel material is sealed can be brought into contact with the surface of the living body. This makes it possible to stimulate the living body effectively in a surface region (defined by the living body contact surface 11a) by a vibration and/or pressure that is applied to the propagation medium 14 by the actuator 12. Thus, it becomes possible to stimulate the living body reliably in a relatively wide surface region while reducing the associated load on the living body.

Since the living body contact surface 11a of the envelope body 11 can be fixed to a living body by the belt 10 (holding member 13) such that the living body contact surface 11a of the envelope body 11 is kept in contact with the living body in a surface region, it is possible to stimulate the living body in a surface region stably without deviation of the stimulus application surface.

Unlike in the related-art cases, it is not necessary to use a projection-like stimulus applying member(s). This prevents a living body from feeling uncomfortable when a projection(s) is pressed against it, that is, lowers the load on the living body. In addition, the living body stimulation device 1 is superior because the stimulus application surface is not formed with a projection(s).

Since the holding member 13 is flexible, the belt 10 can be attached to a living body in ring form by inserting the insertion rod of the buckle 21 into an adjustment hole 22. Since the holding member 13 is a band-like member, the belt 10 can be attached to a living body with a relatively low probability of causing the living body to feel uncomfortable if it is implemented as a collar or a torso ring for a pet, a wrist ring for a human, or the like.

Next, first to third modifications of the living body stimulation device 1 according to the embodiment will be described. The first to third modifications are different from the living body stimulation device 1 according to the embodiment in the numbers and locations of actuators 12 and envelope bodies 11. Therefore, only differences from the living body stimulation device 1 according to the embodiment will be described.

Modification 1

Figure 6:
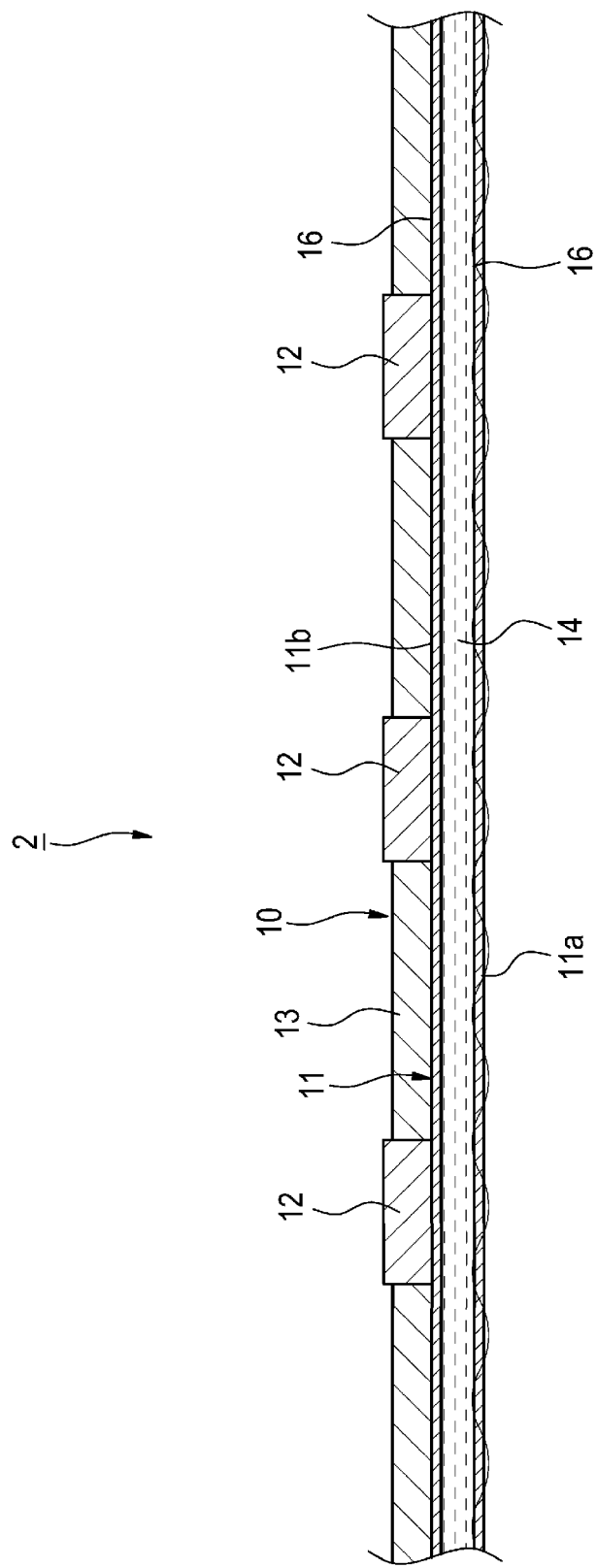
FIG. 6 is a partial sectional view of a living body stimulation device according to a first modification of the embodiment.

FIG. 6 is a partial sectional view of a living body stimulation device 2 according to the first modification in which plural actuator 12 are arranged so as to be spaced from each other in a certain direction across the envelope body 11.

There is a limitation in the distance by which a vibration and/or pressure generated by a single actuator 12 can propagate. Disposing the plural actuators 12 at positions that are spaced from each other makes it possible to transmit a vibration and/or pressure to every corner of the envelope body 11 even in the case where the envelope body 11 is long or has a wide area. By causing the plural actuators 12 to generate vibrations and/or pressures at different frequencies or amplitudes or driving the plural actuators 12 with different modes of timing, the number of patterns in which the living body stimulation device 2 stimulates a living body can be increased.

By use of the plural actuators 12 having different vibration frequency ranges, it is possible to cover a wide frequency band.

Modification 2

Figure 7:
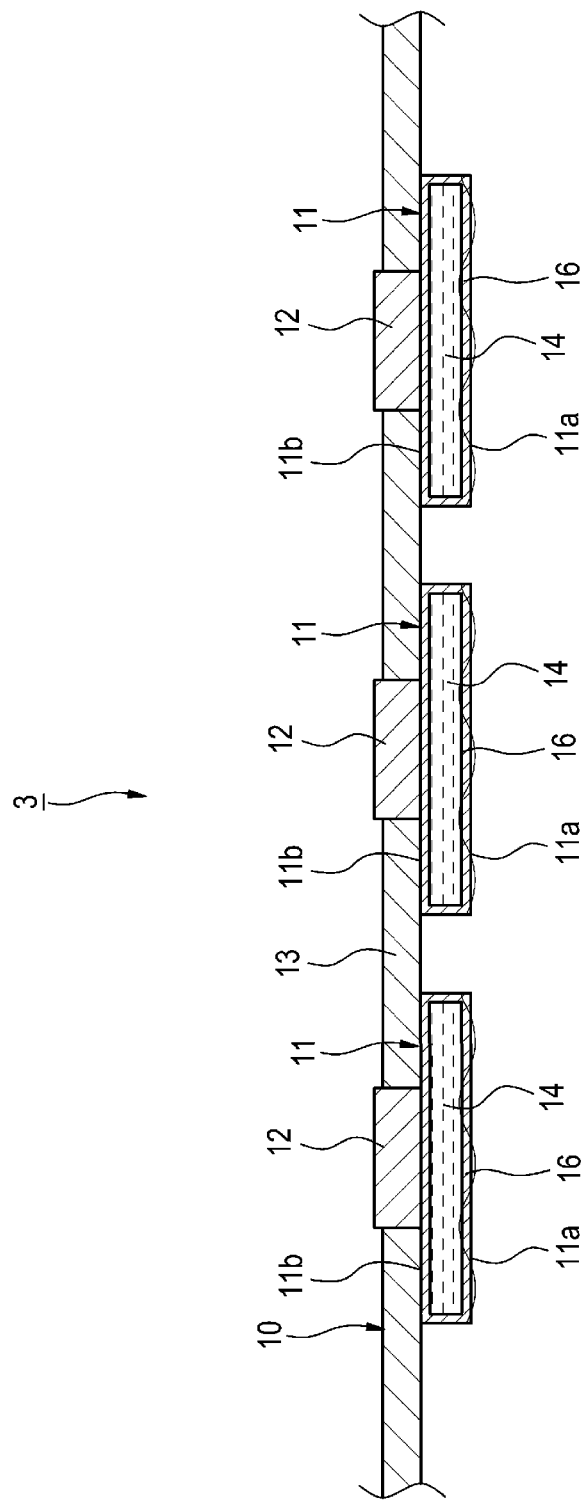
FIG. 7 is a partial sectional view of a living body stimulation device according to a second modification of the embodiment.

FIG. 7 is a partial sectional view of a living body stimulation device 3 according to the second modification in which plural envelope bodies 11 are arranged in the length direction of the holding member 13 and provided with respective actuators 12.

With this configuration, the living body stimulation device 3 can stimulate a living body at the locations of the respective envelope bodies 11 by vibrations and/or pressures generated by the different actuators 12. This makes it possible to vary the location where to stimulate the living body. For example, it becomes possible to stimulate the living body in a pattern in which the stimulation location is shifted in order (e.g., from left to right). This is done easily by making proper controls on the respective actuators 12.

Although in the living body stimulation device 3 the plural envelope bodies 11 are arranged in the length direction of the holding member 13, plural envelope bodies 11 may be arranged in the width direction of the holding member 13 or in both of the length direction and the width direction of the holding member 13.

Modification 3

Figure 8:
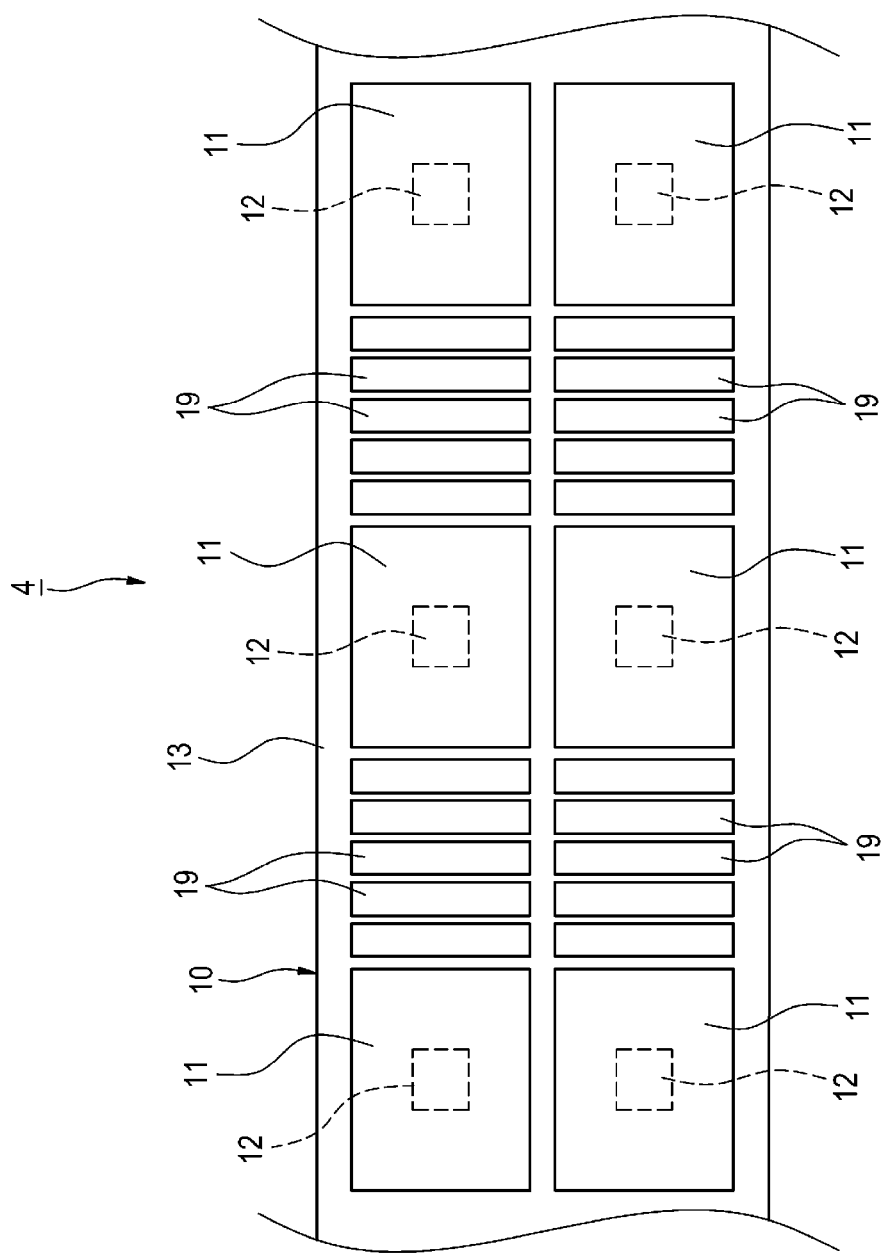
FIG. 8 is a partial plan view of a living body stimulation device according to a third modification of the embodiment as viewed from inside (i.e., from the side of the surface of attachment to a living body).

FIG. 8 is a partial plan view of a living body stimulation device 4 according to the third modification as viewed from inside (i.e., from the side of the living body contact surface 11a) in which plural envelope bodies 11 are arranged in both of the length direction and the width direction of the holding member 13. As shown in FIG. 8, a spacer(s) 19 is disposed between adjoining envelope bodies 11.

Where plural envelope body 11 are arranged in the manner of the second embodiment, a relatively long gap may be formed between adjoining envelope bodies 11, in which case the envelope bodies 11 are not in contact with the surface of a living body continuously even in a substantial sense. As a result, the living body may feel uncomfortable, that is, sense contact at discrete locations.

In contrast, in the living body stimulation device 4 according to the third modification, a spacer(s) 19 that is disposed between adjoining envelope bodies 11 is in contact with the surface of the living body between the adjoining envelope bodies 11. As a result, the living body would feel less uncomfortable because it could sense contact in a continuous area.

The spacers 19 may be made of the same material as the envelope bodies 11, and the same medium as the propagation medium 14 may be sealed in each envelope body 11 at the same density. In this case, the contact feel of the spacers 19 is made the same as that of the envelope bodies 11, which also contributes to reduction of the discomfort. Alternatively, a gas such as air may be sealed in the spacers 19.

As shown in FIG. 8, plural narrow spacers 19 may be disposed adjoining envelope bodies 11. In this configuration, the holding member 13 can be bent easily at a portion having spacers 19. That is, the holding member 13 can be bent easily so as to conform to a portion, having a bent surface, of a living body with spacers 19 kept in contact with the bent surface. The living body stimulation device 4 is thus high in the ability to conform to a shape of a living body.

Although in the embodiment the living body stimulation device 1 is of a belt type, the invention can also be applied to other types of devices, members, etc. to be brought into contact with a surface of a living body such as devices in which the envelope body 11 provided with the actuator 12 is attached to a wrist watch, a vehicle seat, or the like to stimulate a surface of a living body (i.e., a human skin). The envelope body 11 provided with the actuator 12 may be attached to a holding member such as clothes, a hat, helmet, or the like to stimulate a prescribed portion of the surface of a living body (i.e., a human skin). As such, the invention can be applied to any kinds of devices, members, etc.

Although in the embodiment the envelope body 11 is rectangular in a plan view, the envelope body may have any shape; it may be circular in a plan view or have a cylindrical shape having closed ends.

Although in the embodiment the envelope body 11 has the living body contact surface 11a and the second surface 11b, the envelope body may have only the living body contact surface; the sheet-like member having the second surface may be omitted by using a surface of a portion of the holding member as the second surface of the envelope body.

The invention claimed is:

1. A living body stimulation device comprising:
    an envelope body having a living body contact surface which is to be brought into contact with a stimulation-target site of a living body;
    a propagation medium sealed in the envelope body and made of a liquid or gel material capable of transmitting a vibration and/or pressure; and
    an actuator configured to apply the vibration and/or pressure to the propagation medium,
    wherein the vibration and/or pressure applied to the propagation medium by the actuator propagates through the propagation medium to the living body contact surface of the envelope body, to thereby stimulate the living body.

2. The living body stimulation device of claim 1, further comprising:
    a holding member which is to be attached to the living body,
    wherein the envelope body is attached to the holding member, to thereby allow the living body contact surface to be kept in contact with the stimulation-target site.

3. The living body stimulation device of claim 2, wherein the holding member is flexible.

4. The living body stimulation device of claim 2, wherein the holding member is a band-like body.

5. The living body stimulation device of claim 2, wherein plural envelope bodies are arranged in a length and/or width direction of the holding member and provided with respective actuators.

6. The living body stimulation device of claim 5, wherein one or more of spacers are disposed between adjoining ones of the envelope bodies.

7. The living body stimulation device of claim 6, wherein the spacers are made of the same material as the envelope bodies and the same medium as the propagation medium is sealed in the spacers.

8. The living body stimulation device of claim 1, wherein plural actuators are arranged so as to be spaced from each other in an extension direction of the envelope body.

9. The living body stimulation device of claim 1, wherein the actuator is one of a piezoelectric device, an electromagnetic device, a magnetostrictive device, and an actuator that generates a vibration and/or pressure utilizing a liquid pressure or a pneumatic pressure.

10. The living body stimulation device of claim 1, wherein the living body contact surface is a polyamide film.

11. The living body stimulation device of claim 1, wherein the propagation medium is one of distilled water, a silicone gel, a mineral oil, an electrorhelogical (ER) fluid whose viscosity can be adjusted electrically, and a conductive ionic gel or liquid.

12. The living body stimulation device of claim 1, wherein the actuator is attached to the holding member so as to be in contact with a second surface of the envelope body, opposite to the living body contact surface.

13. The living body stimulation device of claim 1, wherein the actuator is attached to the living body contact surface.

14. The living body stimulation device of claim 1, wherein the actuator is disposed in the propagation medium which is sealed in the envelope body.

15. The living body stimulation device of claim 14, wherein the actuator is disposed in the propagation medium such that it is in contact with the propagation medium by only one of its side surfaces.

16. The living body stimulation device of claim 1, wherein the actuator is an extension of the envelope body.

17. The living body stimulation device of claim 1, wherein the actuator comprises:
top and bottom sheet members; and
top and bottom conductive layers disposed respectively on the top and bottom sheet members, wherein:
the bottom sheet member is located on a side of the living body contact surface and the bottom conductive layer is inside the envelope body,
the top sheet member is located on a second surface of the envelope body and the top conductive layer is outside the envelope body,
the bottom conductive layer is in electrical contact with the propagation medium, and
the top conductive layer is electrically insulated from the propagation medium by the top sheet member which is an insulative material.

18. The living body stimulation device of claim 1, wherein the actuator comprises:
a bottom sheet member; and
a top conductive layer and a bottom conductive layer, disposed on respective sides of the bottom sheet member,
wherein the bottom conductive layer is inside the envelope body in electrical contact with the propagation medium and the top conductive layer is the living body contact surface.

19. A living body stimulation method comprising:
bringing a living body contact surface of an envelope body into contact with a stimulation-target site of a living body, a propagation medium being sealed in the envelope body, the propagation medium being made of a liquid or gel material capable of transmitting a vibration and/or pressure; and
applying a vibration and/or pressure to the propagation medium such that the vibration and/or pressure propagates through the propagation medium to the living body contact surface of the envelope body, thereby stimulating the living body.

20. The living body stimulation method of claim 19, further comprising:
attaching a holding member to the living body, thereby allowing the living body contact surface of the envelope body to be kept in contact with the stimulation-target site.

* * * * *